United States Patent
Hamada et al.

(10) Patent No.: US 7,061,751 B2
(45) Date of Patent: Jun. 13, 2006

(54) ELECTRONIC APPARATUS WITH A SPEAKER

(75) Inventors: Tomohiro Hamada, Hamura (JP); Atsushi Tatemichi, Musashino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 245 days.

(21) Appl. No.: 10/730,056

(22) Filed: Dec. 9, 2003

(65) Prior Publication Data
US 2005/0122668 A1 Jun. 9, 2005

(51) Int. Cl.
*H05K 5/00* (2006.01)
(52) U.S. Cl. ..................... 361/679; 361/686
(58) Field of Classification Search .............. 361/679
See application file for complete search history.

(56) References Cited

U.S. PATENT DOCUMENTS 5,646,820 A  7/1997  Honda et al.
6,157,312 A * 12/2000  Sheridan et al. ......... 340/693.5
6,222,725 B1 * 4/2001  Jo ................................ 361/683

* cited by examiner

*Primary Examiner*—Yean-Hsi Chang
(74) *Attorney, Agent, or Firm*—Pillsbury Winthrop Shaw Pittman, LLP

(57) ABSTRACT

A first case has a wall. The wall of the first case has a plurality of holes. A second case is coupled to the first case for forming a housing. The second case has a wall. The wall of the second case has a plurality of holes. A speaker is provided in the housing. The speaker is facing to the holes of the first and second case.

8 Claims, 3 Drawing Sheets

US 7,061,751 B2

ELECTRONIC APPARATUS WITH A SPEAKER

BACKGROUND OF THE INVENTION

1. Field of the Invention

The present invention relates to an electronic apparatus such as a portable computer, which comprises a speaker.

2. Description of the Related Art

Electronic apparatuses, such as portable computers, which comprise a speaker, are known as is disclosed in U.S. Pat. No. 5,646,820. The housing of such an electronic apparatus comprises a case and a bottom plate. The case opens at the bottom and back. The bottom plate covers the open bottom of the case. The front wall of the case has a notch. The speaker is supported by a support panel. The speaker and the support panel constitute a speaker unit. The support panel has, in its center part, a number of small holes through which sound may come out.

The speaker unit is fitted in the notch made in the front wall of the housing. The speaker is thereby held within the housing. The support panel lies, substantially in flush with the front wall of the case, forming a part of the front wall.

In the conventional apparatus described in U.S. Pat. No. 5,646,820 a wall is provided, which extends downward from one edge of the top wall of the case for a distance equal to the height of the speaker. The speaker is provided in the case and faces this wall. Sound holes are made in the wall extending from the top wall of the case and so positioned to face the speaker. Alternatively, a wall may be provided, which extends upward from one edge of the bottom plate of the housing for a distance equal to the height of the speaker, and the speaker may be provided in the case and face this wall. In this case, sound holes are made in the wall extending from the bottom plate and so positioned to face the speaker. To contain the speaker in the portable computer, a wall as high as the speaker extends downward from one edge of top wall of the case or upward from one edge of the bottom plate of the housing. This imposes restriction on the shape of the housing. The portable computer may not acquire any appearance desired.

BRIEF SUMMARY OF THE INVENTION

An electronic apparatus according to an aspect of the present invention comprises a housing having a first case and a second case that covers the first case, and a speaker provided in the housing. The first case has a wall that faces the speaker. The second case has a wall that faces the speaker and abuts on the wall of the first case. Sound holes are made in the walls of the first and second cases and oppose the speaker.

DETAILED DESCRIPTION OF THE INVENTION

A portable computer 1, which is the first embodiment of this invention, will be described with reference to FIGS. 1 to 4.

Figure 1:
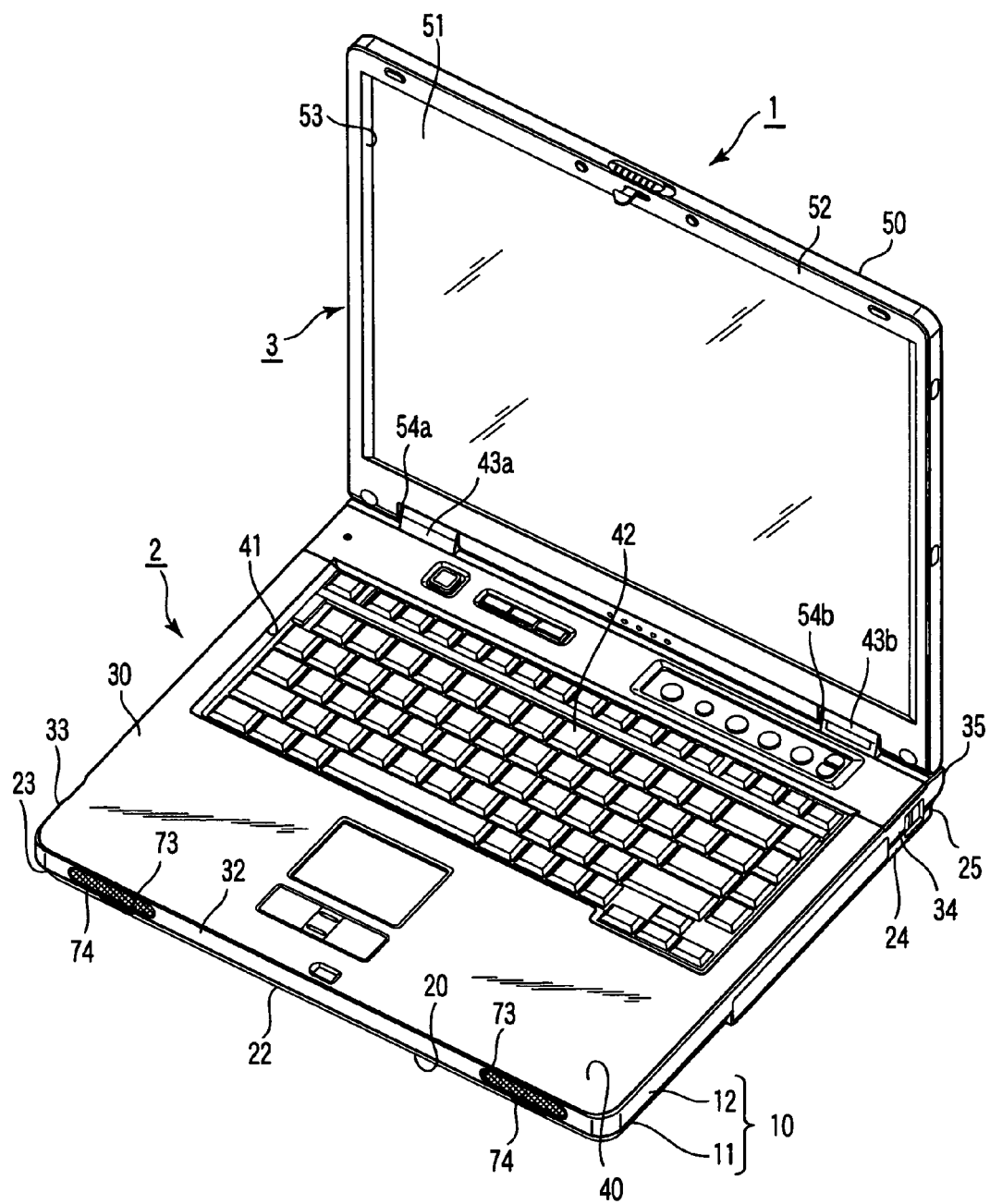
FIG. 1 is a perspective view of a portable computer according to a first embodiment of this invention.

FIG. 1 shows the portable computer 1, which is a notebook-type one. The portable computer 1 comprises a main unit 2 and a liquid crystal display unit 3.

The main unit 2 has a housing 10. The housing 10 is made from resin. The housing 10 is shaped like a flat box and comprises two cases 11 and 12. The first case, or lower case 11, has a bottom wall 20, a front wall 22, a left side wall 23, a right side wall 24 and a rear wall 25. The front wall 22 extends upward from the front edge of the bottom wall 20 that is a rectangular plate. The left side wall 23 and the right side wall 24 extend upward from the left and right edges of the bottom wall 20, respectively. The rear wall 25 extends upward from the rear edge of the bottom wall 20. The second case, or upper case 12, has a top wall 30, a front wall 32, a left side wall 33, a right side wall 34 and a rear wall 35. The upper wall 30 is a rectangular plate and faces the bottom wall 20 of the lower case 11. The front wall 32 extends downward from the front edge of the top wall 30. The left side wall 33 and the right side wall 34 extend downward from the left and right edges of the top wall 30, respectively. The rear wall 35 extends downward from the rear edge of the top wall 30.

Figure 2:
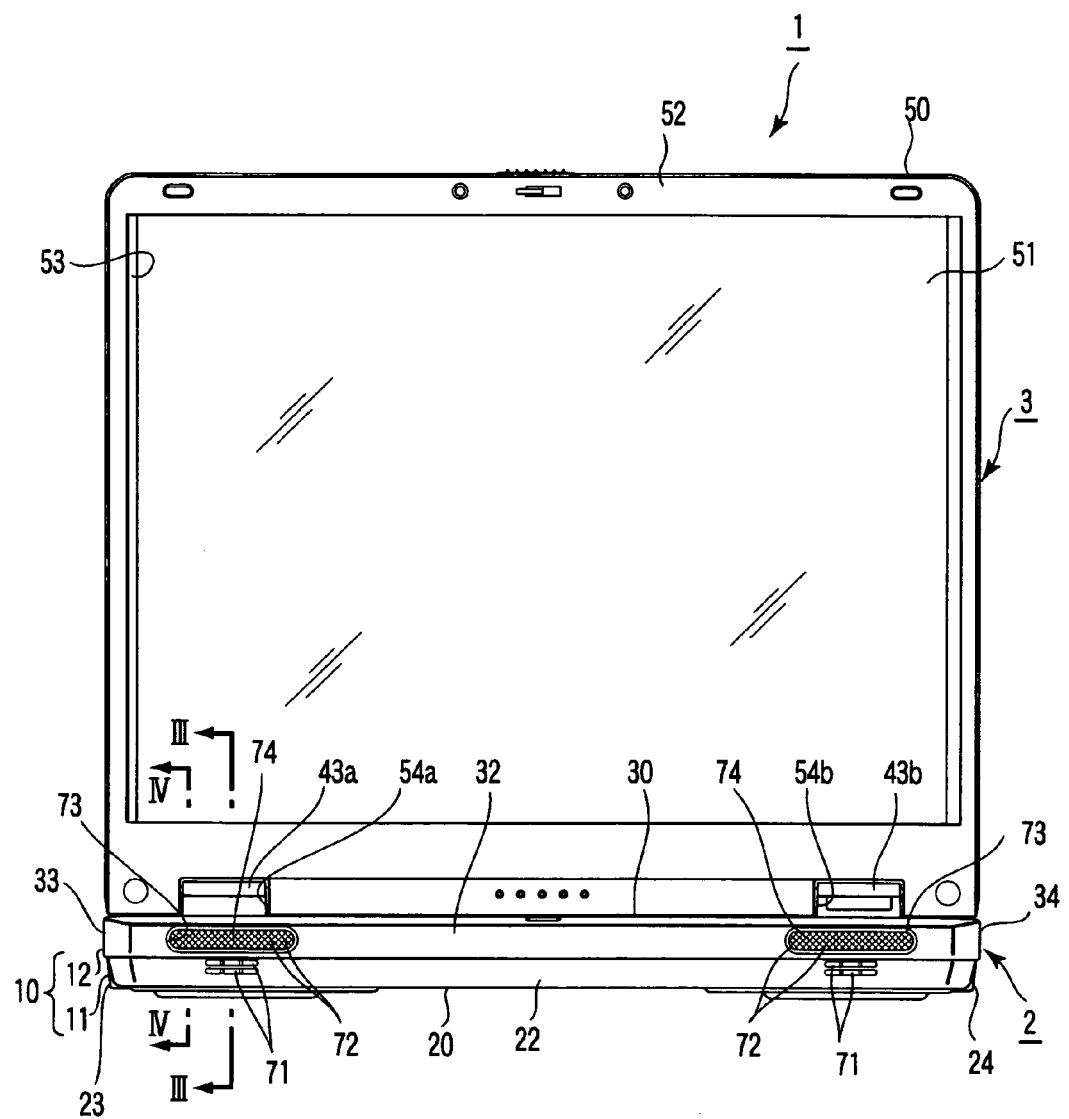
FIG. 2 is a front view of the portable computer that is illustrated in FIG. 1.

As FIGS. 1 and 2 show, the upper case 12 covers the lower case 11 from above. More specifically, the front wall 32, left side wall 33, right side wall 34 and rear wall 35 of the upper case 12 abut, at their edges, on the front wall 22, left side wall 23, right side wall 24 and rear wall 25 of the lower case 11, respectively. As FIGS. 3 and 4, the edge of the upper case 12 has a step opening inside the housing 10, and the edge of the lower case 11 has a step opening outside the housing 10. The lower case 11 and the upper case 12 abut on each other, at the steps that are complementary in shape. Thus, the upper case 12 is secured to the lower case 11. The outer surface 20a of the bottom wall 20 of the lower case 11 is the bottom surface of the housing 10. When the portable computer 1 is placed on, for example, the top of a desk (not shown), the outer surface 20a contacts the top of the desk.

The outer surface 30a of the top wall 30 of the upper case 12 defines a palm rest 40 and a keyboard mount 41. The palm rest 40 is a front part of the outer surface 30a. The keyboard mount 41 lies at the back of the palm rest 40. A keyboard 42 is mounted on the keyboard mount 41. Two legs 43a and 43b are provided on the rear edge of the upper case 12. The legs 43a and 43b are spaced apart in the widthwise direction of the housing 10. The legs 43a and 43b support the liquid crystal display unit 3. The upper case 12 is a single-piece component. Instead, the upper case 12 may comprise a front member. The front member has the palm rest 40. The rear member has the keyboard mount 41 and the legs 43a and 43b.

The liquid crystal display unit 3 comprises a display housing 50 and a liquid crystal panel 51. The liquid crystal panel 51 is contained in the display housing 50. The housing 50 has a front wall 52 that has an opening 53. The opening 53 is so large that the display screen of the panel 51 is exposed outside the display housing 50.

The display housing 50 has, in its lower edge, a pair of coupling notches 54a and 54b. The notches 54a and 54b open at the front, lower edge and back. The notches 54a and 54b are spaced apart in the widthwise direction of the display housing 50. The legs 43a and 43b of the housing 10 are fitted in the coupling notches 54a and 54b, respectively, and coupled to the display housing 50 with hinges (not shown). Hence, the liquid crystal display unit 3 is supported on the rear edge of the housing 10 and can be rotated.

More specifically, the liquid crystal display unit 3 can be rotated between a closed position and an opened position. In the closed position, the display unit 3 covers the palm rest 40 and keyboard 42 from above. While the display unit 3 remains in the opened position, the palm rest 40 and keyboard 42 are exposed.

Figure 3:
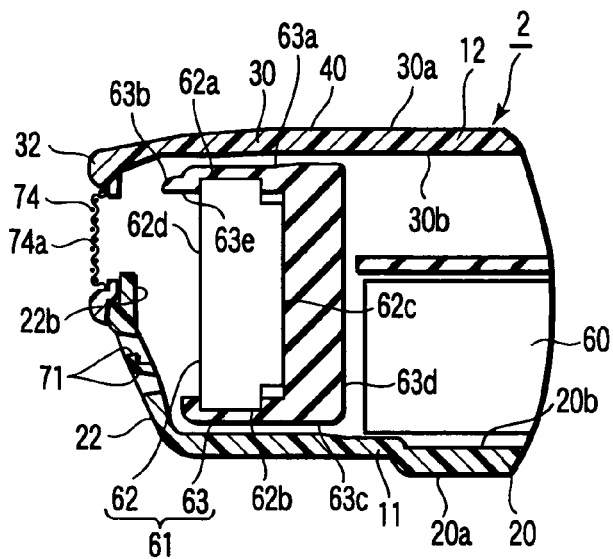
FIG. 3 is a sectional view taken along line III—III shown in FIG. 2.
Figure 4:
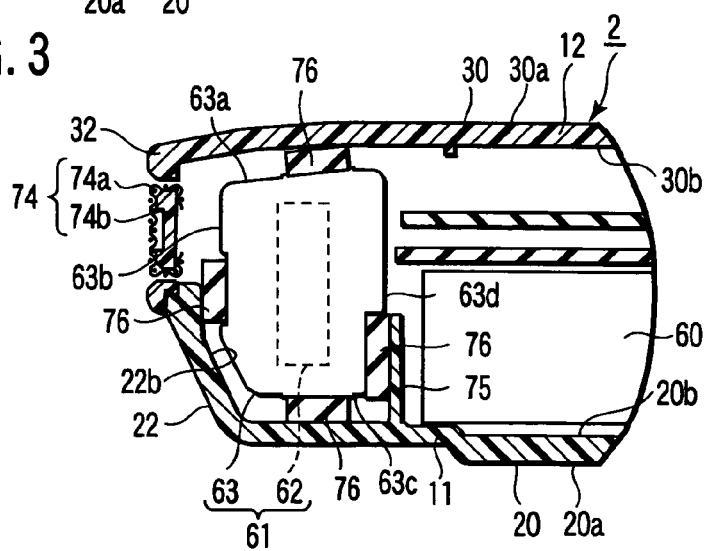
FIG. 4 is a sectional view taken alone line IV—IV shown in FIG. 2.

As FIGS. 3 and 4 show, the housing 10 contains an FDD (Floppy Disk Drive) 60, a pair of speakers 61, a printed circuit board (not shown), a HDD (Hard Disk Drive, not shown) and the like. The printed circuit board, HDD and FDD 60 are fastened to the bottom wall 20 of the housing 10 with screws.

The front wall 22 of the lower case 11 has two groups of sound holes 71, or first holes. The sound holes 71 of one group are spaced apart from the sound holes 71 of the other group in the width direction of the housing 10. The front wall 32 of the upper case 12 has two groups of sound holes 72, or second holes. The sound holes 72 of one group are spaced apart from the sound holes 72 of the other group in the width direction of the housing 10. Further, the front wall 32 of the upper case 12 has two openings 73, through which a pair of speakers 61 provided in the housing 10 are exposed, respectively. Two mesh members 74 are fitted in the openings 73, respectively. Each mesh member 74 comprises a mesh piece 74a and a frame 74b that holds the mesh piece 74a. The mesh pieces 74a define two groups of sound holes 72, respectively. The sound holes 71 made in the front wall 22 of the lower case 11 are larger than the sound holes 72 (i.e., mesh holes) made in the upper case 12. Support ribs 75 protrude from the inner surface 20b of the bottom wall 20 of the lower case 11. The support ribs 75 cooperate with the lower case 11 for supporting the speakers 61.

Each speaker 61 has a vibration member 62 and a support member 63. The vibration member 62 is a device that converts an electric current to sound. It is vibrated by, for example, a permanent magnet or an electromagnet. The support member 63 is a case, which covers the top 62a, left and right sides (not shown), bottom 62b and back 62c of the vibration member 62. The support member 63 does not cover the front 62d of the member 62; it only holds the edges of front 62d. Thus, the front 62d of the vibration member 62 is exposed through the opening 63e made in the front of the support member 63.

Each speaker 61 is so arranged that the front 62d the vibration member 62, which is exposed through the opening 63e made in the front of the support member 63, opposes the sound holes 71 made in the lower case 11 and the sound holes 72 made in the upper case 12. That is, the speaker 61 straddles the lower case 11 and the upper case 12.

Four sets of cushions (elastic members) 76 are used. Two sets are provided at two sides of one speaker 61, respectively, securing the speaker 61 to the inner surface of the housing 10. The remaining two sets are provided at two sides of the other speaker 61, respectively, securing this speaker 61 to the inner surface of the housing 10. The cushions 76 function as vibration absorbers. Each set consists of four cushions 76. The first cushion 76 is arranged between the top 63a of the support member 63 and the inner surface 30b of the top wall 30 of the housing 10. The second cushion 76 locates between the front 63b of the support member 63 and the inner surface 22b of the front wall 22 of the housing 10. The third cushion 76 lies between the bottom 63c of the support member 63 and the inner surface 20b of the bottom wall 20 of the housing 10. The fourth cushion 76 lies between the back 63d of the support member 63 and the front of the support rib 75. FIG. 4 shows only one set of cushions 76, which is provided at one side of the left-side speaker 61. The other set of cushions 61, provided at the other side of the left-side speaker 61, is not shown in FIG. 4. The four cushions 76 of each set may be replaced with a single cushion. In this case, two cushions wrap one speaker 61 and the remaining two cushions wrap the other speaker 61.

In this embodiment of the invention, or the portable computer 1, the lower and upper cases 11 and 12 have front walls 22 and 32, respectively, which abut on each other in front of the speakers 61. Thus, the front wall 32 of the upper case 12 is coupled to the front wall 22 of the lower case 11. Two groups of sound holes 71 are made in the front wall 22 of the lower case 11, and two groups of sound holes 72 are made in the front wall 32 of the upper case 12. The sound holes 71 of one group and the sound holes 72 of one group oppose one speaker 61, while the sound holes 71 of the other group and the sound holes 72 of the other group oppose the other speaker 61. Hence, a wall as high as the speakers 61 need not be provided, extending from the edge of the bottom wall 20 of the lower case 11 or from the edge of the top wall top 30 of the upper case 12. This enhances the freedom of shape of the housing 10. Thus, the housing 10 can be designed more freely than before. The portable computer 1 can then acquire any appearance desired.

As indicated above, each speaker 61 straddles the lower case 11 and the upper case 12. Therefore, the sound that the speaker 61 generates can come out of the housing 10 not only through the sound holes 71 made in the lower case 11, but also through the sound holes 72 made in the upper case 12.

As mentioned above, the sound holes 71 made in the lower case 11 are larger than the sound holes 72 made in the upper case 12. Sound of relatively low pitch (long wavelength), generated by the speakers 61, can well escape from the housing 10 through the sound holes 71 made in the lower case 11.

In the conventional portable computer, the speakers are secured to the housing with screws. The HDD or FDD vibrates while operating. The vibration is inevitably transmitted to the speakers via the housing. When vibrated, the speakers may malfunction or may make annoying sound in some cases.

In the portable computer 1 according this embodiment of the invention, the cushions 76 are laid between each speaker 61 and the inner surface of the housing 10. The cushions 76 secure the speaker 61 to the housing 10. The vibration made by the HDD or FDD 60 is hardly transmitted to the speakers 61. This prevents the speakers 61 from malfunctioning or making annoying sound.

Figure 5:
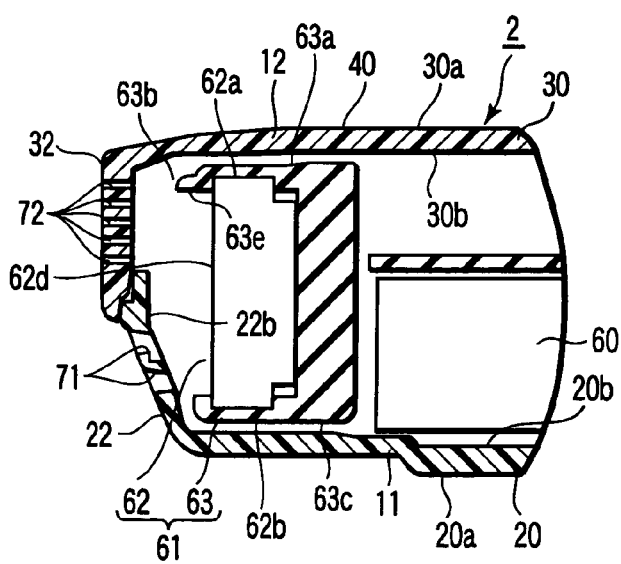
FIG. 5 is a sectional view of a part of a portable computer according to a second embodiment of the invention, depicting the speaker and some other nearby components of the personal computer.

The second embodiment of the present invention will be described, with reference to FIG. 5.

In the second embodiment, the front wall 32 of the upper case 12 has no openings 73 and no mesh members 74 are used at all. In any other structural respects, the second embodiment is identical to the first embodiment. The sound holes 71 made in the lower case 11 are larger than the sound holes 72 made in the upper case 12, as in the first embodiment. The components identical to those of the first embodiment are designated at the same reference numerals in FIG. 5 and will not be described in detail. The second embodiment can achieve the same advantages as the first embodiment.

In the first and second embodiments, the sound holes 71 made in the lower case 11 are larger than the sound holes 72 made in the upper case 12. Nonetheless, the sound holes 71 of the lower case 11 may be as large as or smaller than the sound holes 72 of the upper case 12.

In the first and second embodiments, the speakers 61 oppose the front wall 22 of the lower case 11 and the front wall 32 of the upper case 12. Instead, the speakers 61 may face other walls. It suffices if the speakers 61 face walls that abut on each other in front of the speakers 61. The speakers 61 may therefore face the left side walls 23 and 33, the left side walls 24 and 34, or the rear walls 25 and 35.

Moreover, the first and second cases are the lower case 11 and the upper case 12, respectively, in the first and second embodiments. Nevertheless, the first and second cases need not be jointed in the vertical direction.

The electronic apparatuses according to the present invention are not limited to portable computers. Rather, the invention can be applied to a variety of electronic apparatuses including electronic pocket books, PDAs and the like.

What is claimed is:

1. An electronic apparatus comprising:
   a first case including a wall which has a plurality of holes;
   a second case coupled to the first case for forming a housing, and having a wall which has a plurality of holes; and
   a speaker provided in the housing, the speaker facing to the holes of the first and second cases; and
   an elastic member supporting the speaker to the housing, the elastic member being located between the speaker and an inner surface of the first case, and between the speaker and the inner surface of the second case.

2. The electronic apparatus according to claim 1, wherein the speaker is arranged, straddling the first case and the second case.

3. The electronic apparatus according to claim 1, wherein the holes made in the first case differ in size from the holes made in the second case.

4. The electronic apparatus according to claim 3, wherein the first case is a lower case having a mount surface, the second case is an upper case covering the lower case from above, and the holes made in the first case are larger than holes made in the second case.

5. The electronic apparatus according to claim 1, wherein the speaker has a vibration member and a support member surrounding the vibration member, and the elastic member fastens the support member to the housing.

6. An electronic apparatus comprising:
   a housing having a first case and a second case, the first case having a wall which has a first hole, and the second case having a wall which is coupled to the wall of the first case and has a second hole smaller than a diameter of the first hole;
   a speaker provided in the housing and opposing the first hole and the second hole; and
   an elastic member supporting the speaker to the housing, the elastic member being located between the speaker and an inner surface of the first case, and between the speaker and an inner surface of the second case.

7. The electronic apparatus according to claim 6, wherein the first case has a support rib, the support rib cooperating with the first case for supporting the speaker.

8. The electronic apparatus according to claim 7, wherein the elastic member locates between the speaker and the rib.

* * * * *